United States Patent
Hang et al.

(10) Patent No.: US 11,418,117 B2
(45) Date of Patent: Aug. 16, 2022

(54) SINGLE INDUCTOR MULTI-OUTPUT BUCK-BOOST CONVERTER AND CONTROL METHOD THEREOF

(71) Applicant: Silergy Semiconductor Technology (Hangzhou) LTD, Hangzhou (CN)

(72) Inventors: Kailang Hang, Hangzhou (CN); Liangwei Sun, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 182 days.

(21) Appl. No.: 16/191,592

(22) Filed: Nov. 15, 2018

(65) Prior Publication Data

US 2019/0089251 A1 Mar. 21, 2019

Related U.S. Application Data

(63) Continuation of application No. 15/193,980, filed on Jun. 27, 2016, now Pat. No. 10,164,534.

(30) Foreign Application Priority Data

Jul. 22, 2015 (CN) .......................... 201510435157.1

(51) Int. Cl.
*H02M 3/158* (2006.01)
*H02M 1/00* (2006.01)

(52) U.S. Cl.
CPC ........ *H02M 3/1582* (2013.01); *H02M 1/0003* (2021.05); *H02M 1/009* (2021.05)

(58) Field of Classification Search
CPC ...... H02M 1/08; H02M 3/158; H02M 3/1582; H02M 2001/0003; H02M 2001/0009; H02M 3/1584; H02M 3/1586; H02M 1/0003; H02M 1/0009; H02M 1/009; H02M 1/0025; H02M 1/0041
USPC ....................................................... 323/267
See application file for complete search history.

(56) References Cited

U.S. PATENT DOCUMENTS

| | | | |
|---|---|---|---|
| 7,432,689 B2 | 10/2008 | Miller et al. | |
| 7,446,431 B2 | 11/2008 | Chiu | |
| 8,232,743 B2 | 7/2012 | Chen | |
| 8,624,429 B2* | 1/2014 | Jing | H02M 3/158 307/18 |
| 8,674,669 B2 | 3/2014 | Chen | |
| 9,088,211 B2 | 7/2015 | Ivanov et al. | |
| 9,287,781 B2 | 3/2016 | Wilson | |

(Continued)

FOREIGN PATENT DOCUMENTS

| | | | |
|---|---|---|---|
| CN | 103178711 A | | 6/2013 |
| KR | 20160080835 A | * | 7/2016 |

*Primary Examiner* — Thienvu V Tran
*Assistant Examiner* — Shahzeb K Ahmad (57) ABSTRACT

A converter can include: (i) a first switch having a first terminal for receiving an input voltage, and a second terminal coupled to a first terminal of a second switch; (ii) an inductor having a first terminal coupled to a common node of the first and second switches, and a second terminal coupled to a first terminal of a third switch, where second terminals of the second and third switches are coupled to ground; and (iii) a plurality of output channels coupled to a common node of the inductor and the third switch, where the converter operates in a buck-boost mode, a buck mode, or a boost mode based on the relationship between the input voltage and output voltages of the plurality of output channels.

20 Claims, 5 Drawing Sheets

(56) References Cited

U.S. PATENT DOCUMENTS

| | | |
|---|---|---|
| 2005/0110471 A1 | 5/2005 | Mayega et al. |
| 2005/0264271 A1 | 12/2005 | Lam et al. |
| 2009/0039852 A1 | 2/2009 | Fishelov et al. |
| 2011/0089915 A1* | 4/2011 | Qiu ...................... H02M 3/156 323/271 |
| 2011/0187189 A1 | 8/2011 | Moussaoui et al. |
| 2011/0221412 A1 | 9/2011 | Li et al. |
| 2012/0043947 A1 | 2/2012 | Wilson |
| 2012/0326691 A1* | 12/2012 | Kuan ................... H02M 3/158 323/299 |
| 2013/0229058 A1* | 9/2013 | Chen ........................ H02J 1/00 307/31 |
| 2014/0225577 A1* | 8/2014 | Ivanov ................ H02M 3/1582 323/225 |
| 2015/0357914 A1* | 12/2015 | Ozanoglu ............. H02M 3/158 323/271 |
| 2016/0066378 A1 | 3/2016 | Wang et al. |
| 2017/0012529 A1* | 1/2017 | Yamada ................ H02M 3/158 |

* cited by examiner

SINGLE INDUCTOR MULTI-OUTPUT BUCK-BOOST CONVERTER AND CONTROL METHOD THEREOF

RELATED APPLICATIONS

This application is a continuation of the following application, U.S. patent application Ser. No. 15/193,980, filed on Jun. 27, 2016, and which is hereby incorporated by reference as if it is set forth in full in this specification, and which also claims the benefit of Chinese Patent Application No. 201510435157.1, filed on Jul. 22, 2015, which is incorporated herein by reference in its entirety.

FIELD OF THE INVENTION

The present invention generally relates to the field of the power electronics, and more particularly to single inductor multi-output buck-boost converters and associated control methods.

BACKGROUND

In a power management integrated circuit, a plurality of output voltages are typically used in order to supply power to corresponding modules. For example, both the central processing unit (CPU) and display screen may be powered in a cellphone, and different modules can have different supply voltage requirements. Therefore, multiple converter outputs can be used to satisfy the application requirements. That is, multiple voltage conversion circuits may be used to satisfy such requirements since one voltage conversion circuit typically only has one output.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
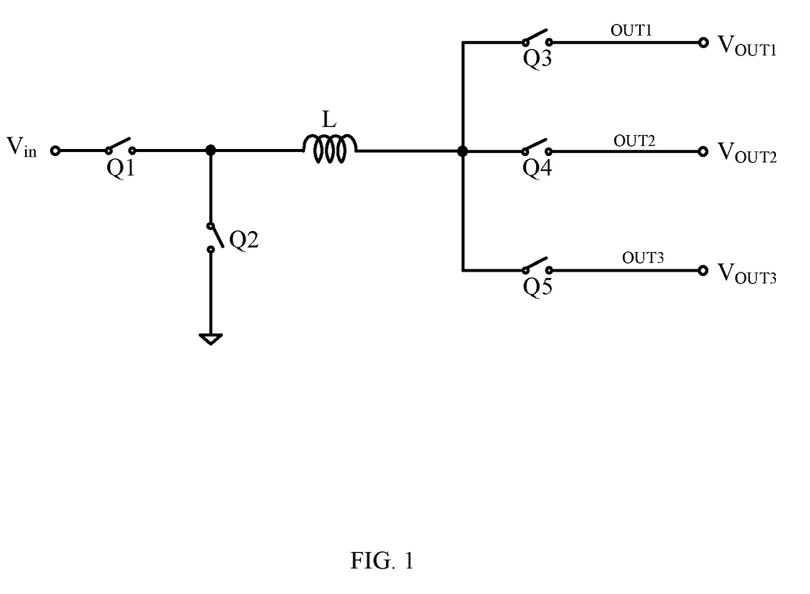
FIG. 1 is a schematic block diagram of an example buck-type single inductor multi-output circuit.
Figure 2:
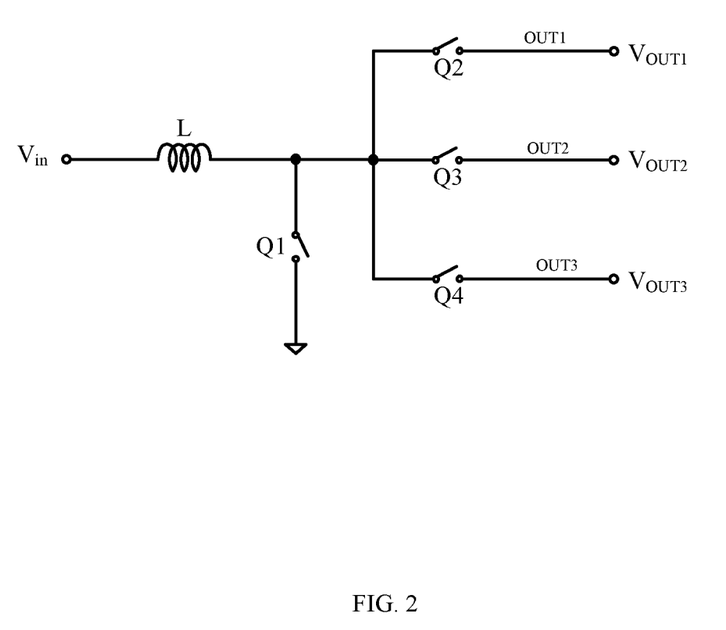
FIG. 2 is a schematic block diagram of an example boost-type single inductor multi-output circuit.

FIGS. 1 and 2 show example single inductor multi-output circuits having two types: buck-type and boost-type. Referring now to FIG. 1, shown is a schematic block diagram of an example buck-type single inductor multi-output circuit. This example circuit can include input voltage Vin, main power switch Q1 and rectifying switch Q2 that are alternately turned on, and switches Q3, Q4, and Q5 that are respectively used to control corresponding output channels (e.g., OUT1, OUT2, and OUT3). However, in such a circuit, at least one output channel should have an output voltage that is lower than an input voltage, and a conduction time that is longer than a predetermined time during each switching cycle, in order to avoid abnormal operation due to the inductor not being able to sufficiently store energy.

Referring now to FIG. 2, shown is a schematic block diagram of an example boost-type single inductor multi-output circuit. This example circuit can include input voltage Vin, main power switch Q1 for transmitting energy to inductor L in a conduction state, and switches Q2, Q3, and Q4 that are respectively used to control corresponding output channels (e.g., OUT1, OUT2, and OUT3), for transmitting energy stored in inductor L thereto. However, in such a circuit, at least one output channel should have an output voltage that is higher than an input voltage, and a conduction time to be longer than a predetermined time during each switching cycle, in order to avoid the inductor current not being reset.

In one embodiment, a converter can include: (i) a first switch having a first terminal for receiving an input voltage, and a second terminal coupled to a first terminal of a second switch; (ii) an inductor having a first terminal coupled to a common node of the first and second switches, and a second terminal coupled to a first terminal of a third switch, where second terminals of the second and third switches are coupled to ground; and (iii) a plurality of output channels coupled to a common node of the inductor and the third switch, where the converter operates in a buck-boost mode, a buck mode, or a boost mode based on the relationship between the input voltage and output voltages of the plurality of output channels. In addition, a method of controlling the converter can include: (i) determining whether the converter operates in a buck-boost mode, a buck mode, or a boost mode based on the relationship between the input voltage and output voltages of the plurality of output channels; and (ii) controlling the first, second, and third switches in response to the determined mode of operation and a switching cycle of the converter.

Figure 3:
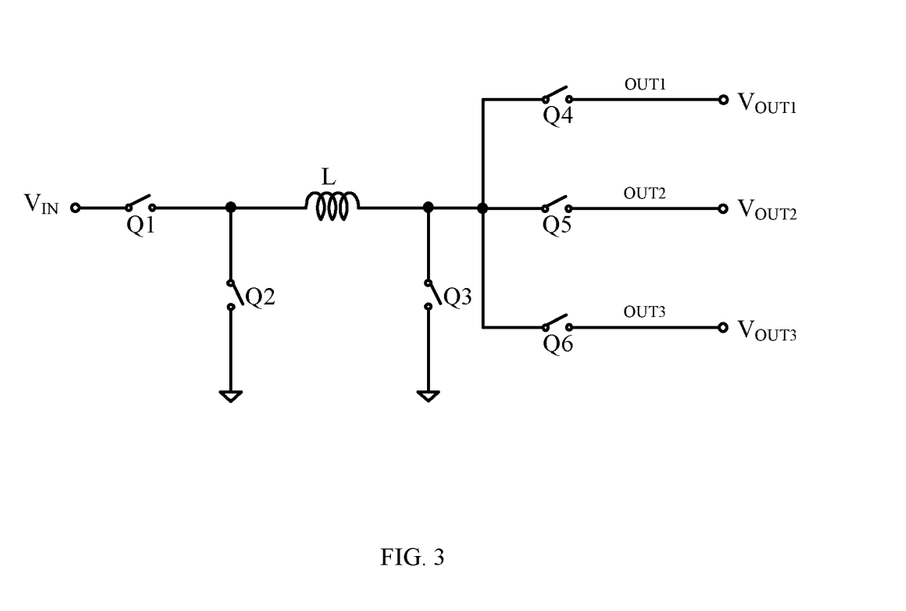
FIG. 3 is a schematic block diagram of an example multi-output buck-boost circuit with a single inductor, in accordance with embodiments of the present invention.

Referring now to FIG. 3, shown is a schematic block diagram of an example multi-output buck-boost circuit with a single inductor, in accordance with embodiments of the present invention. In this particular example, the converter can include switches Q1, Q2, and Q3, inductor L, and a plurality of output terminals. Each output terminal can connect to a switch for turning on and off the corresponding channel. In this example, there are three output terminals (e.g., OUT1, OUT2, and OUT3), but more or fewer than three output terminals can also be supported in particular embodiments. Switch Q1 has a first terminal for receiving input voltage Vin, and a second terminal that can connect to a first terminal of switch Q2. A common node of switches Q1 and Q2 can connect to a first terminal of inductor L, and a second terminal of inductor L can connect to a first terminal of switch Q3. Second terminals of switches Q2 and Q3 can connect to ground, and a common node of inductor L and switch Q3 can be coupled to the plurality of output terminals.

In particular embodiments, a single inductor multi-output circuit operating in a buck-boost mode may have three operation stages within a given switching cycle. In operation stage 1, both of switches Q1 and Q3 may be on switch Q2 may be off, inductor L can receive energy from input voltage Vin, and the plurality of output channels can all be off. In operation stage 2, switch Q1 can be on, switches Q2 and Q3 may be off, energy may be transmitted from input voltage Vin to the plurality of output channels, and the output channels can be sequentially turned on one by one. In operation stage 3, switches Q1 and Q3 may be off, switch Q2 may be on, and the output channels can be turned on one by one until the switching cycle ends. Thus, the plurality of output channels can be (e.g., sequentially) turned on one by one during the second and third operation stages, and the last output channel can remain on until the switching cycle ends.

The converter can also operate in other modes, as opposed to the buck-boost mode whereby some output channels have a larger output voltage than the input voltage, and other output channels have a smaller output voltage than input voltage. For example, the converter can operate in a buck mode or a boost mode whereby the input voltage is either larger than all of the output voltages, or smaller than all of the output voltages. The operation mode of the converter can thus be determined based on the relationship between the input voltage and the output voltages, such as including considerations of application requirements (e.g., output voltage levels for CPU, display, etc.).

In the buck mode, when input voltage Vin is relatively large (e.g., larger than all output voltages), and during a first portion of the switching cycle, switch Q3 can be off, switch Q1 can be turned on to directly transmit energy to the output channels, and the plurality of output channels can be turned on in sequential fashion (e.g., one by one). Then, during a second portion of the switching cycle, switch Q1 can be turned off, and switch Q2 can be turned on (e.g., as a free-wheeling diode).

In the boost mode, when input voltage Vin is relatively small (e.g., input voltage Vin is smaller than all output voltages), and during a first portion of the switching cycle, switch Q2 can be off, switches Q1 and Q3 can be turned on to transmit energy from input voltage Vin to inductor L, and all the output channels may be off. Then, during a second portion of the switching cycle, switch Q3 can be turned off to transmit energy from input voltage Vin to the plurality of output channels, and the output channels can be turned on in sequential fashion (e.g., one by one).

Figure 4:
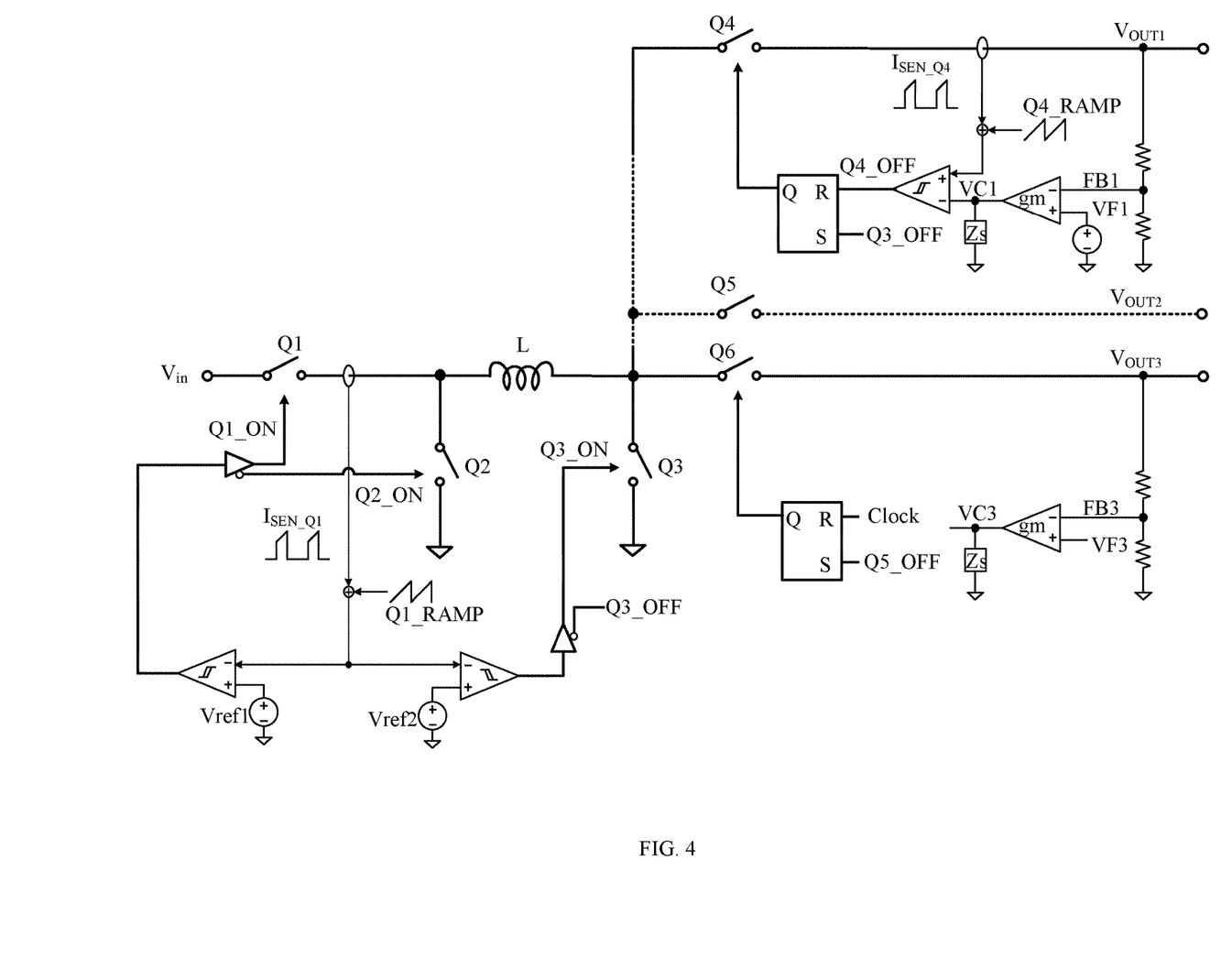
FIG. 4 is a more detailed schematic block diagram of an example multi-output buck-boost circuit with a single inductor, in accordance with embodiments of the present invention.

Referring now to FIG. 4, shown is a more detailed schematic block diagram of an example multi-output buck-boost circuit with a single inductor, in accordance with embodiments of the present invention. In this particular example, sawtooth signal Q1_RAMP can be compared against reference signal Vref1 to generate control signals for turning on/off switches Q1 and Q2. For example, control signal Q1_ON can be used to control switch Q1, and control signal Q2_ON obtained by inverting control signal Q1_ON can be used to control switch Q2. Ramp wave signal Q1_RAMP may also be compared against reference signal Vref2 to generate control signal Q3_ON for turning on/off switch Q3. In addition, current sense signal $I_{SEN\_Q1}$ obtained by sampling the inductor current can be superimposed with sawtooth wave signal Q1_RAMP, and may further be respectively compared against reference signals Vref1 and Vref2.

By inverting control signal Q3_ON of switch Q3, control signal Q3_OFF can be used for turning on channel OUT1. In order to obtain control signal Q4_OFF for turning off channel OUT1, output voltage feedback signal FB1 can be obtained by sampling output voltage $V_{OUT1}$ of channel OUT1. Feedback compensation signal VC1 can be obtained by comparing output voltage feedback signal FB1 against corresponding reference voltage VF1, and compensating a difference therebetween via compensation module Zs. Also, current sense signal $I_{SEN\_Q4}$ can be obtained by sampling an output current of channel OUT1, and that it may be superimposed with corresponding sawtooth wave signal Q4_RAMP, and further compared against feedback compensation signal VC1, to generate control signal Q4_OFF.

After completing the turning on and off procedure of the first channel, the first channel can be turned off, and the second channel can begin to be turned on at substantially the same time. That is, the latter channel can be substantially simultaneously turned on when the former channel is turned off, so the control signal for turning off the former channel can be used as the control signal for turning on the current channel. In order to turn off the current channel, a feedback compensation signal may be obtained by sampling and compensating an output voltage of the current channel, and an output current of the current channel can be sampled and further superimposed with a corresponding sawtooth wave signal, to be compared against the feedback compensation signal for turning off the current channel.

In this example, OUT2 can be described as the "current" channel, and OUT1 may be described as the "former" channel, and accordingly the remaining channels can be controlled as described above. Thus the last channel can be turned on by the control signal that is used to turn off the former channel. In this example, fixed-frequency control may be employed with a clock signal "Clock" to turn off the last channel at the end of the switching cycle, which may be the last channel simultaneously turned off when the on time of the clock signal completes. It is to be understood that the control is not limited to fixed frequency, such as by adjusting the time length of high level or low level of the clock signal.

Figure 5:
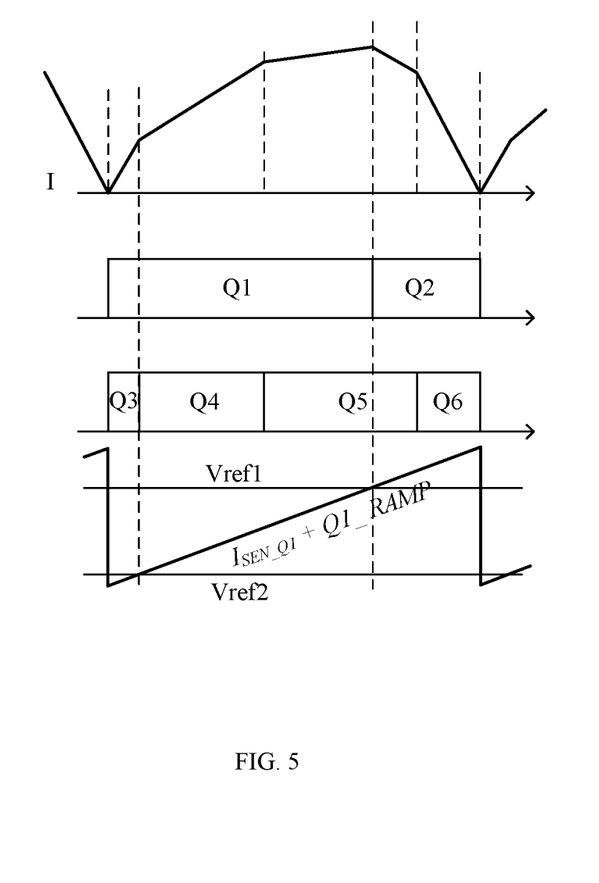
FIG. 5 is a waveform diagram of example operation of a multi-output buck-boost circuit with a single inductor, in accordance with embodiments of the present invention.

Referring now to FIG. 5, shown is a waveform diagram of example operation of a multi-output buck-boost circuit with a single inductor, in accordance with embodiments of the present invention. This diagram shows the operation states, on time and off time of switches, and the waveform of the inductor current, where I denotes the inductor current, and Q1, Q2, Q3, Q4, Q5, and Q6 represent the on time intervals of corresponding switches. FIG. 5 also shows the relationship between sawtooth wave signal Q1_RAMP and reference signals Vref1 and Vref2. For example, the difference between reference signals Vref1 and Vref2 is smaller than the peak to peak value of sawtooth wave signal Q1_RAMP. Reference signal Vref1 may be smaller than the peak value of sawtooth wave signal Q1_RAMP, and reference signal Vref2 can be larger than the valley value of sawtooth wave signal Q1_RAMP. Reference signal Vref1 may be determined according to output voltages of a plurality of output channels. For example, Vref1=K1*Vc1+K2*Vc2+K3*Vc3, where coefficient K may be adjusted according to the importance or priority of different channels.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A converter, comprising:
   a) a first switch having a first terminal for receiving an input voltage, and a second terminal coupled to a first terminal of a second switch;
   b) an inductor having a first terminal coupled to a common node of said first and second switches, and a second terminal coupled to a first terminal of a third switch, wherein second terminals of said second and third switches are directly connected to ground;
   c) a plurality of output channels coupled to a common node of said inductor and said third switch, wherein said converter operates in any of a buck-boost mode, a buck mode, or a boost mode as determined based on the relationship between said input voltage and a plurality of output voltages of said plurality of output channels; and
   d) a control circuit configured to control said first and second switches based on a first reference signal that is generated from a summation based on said plurality of output voltages and a plurality of coefficients that correspond to said plurality of output channels, wherein said plurality of coefficients are adjustable in accordance with weighted priorities of each of said plurality of output channels.

2. The converter of claim 1, wherein:
   a) when said converter operates in said buck-boost mode, said first and third switches are turned on and said inductor receives energy from said input voltage during a first operation stage of a switching cycle of said converter, said third switch is turned off and said plurality of said output channels are sequentially turned on during a second operation stage of said switching cycle, and said first switch is turned off, said second switch is turned on, and said plurality of said output channels are sequentially turned on during a third operation stage of said switching cycle;
   b) when said converter operates in said buck mode, said third switch is off, said first switch is turned on to transmit energy to said plurality of output channels, and said plurality of output channels are sequentially turned on during a first portion of a switching cycle of said converter, and said second switch is turned on as a free-wheeling diode during a second portion of said switching cycle; and
   c) when said converter operates in said boost mode, said second switch is off, said first and third switches are turned on to transmit energy from said input voltage to said inductor, and each of said plurality of output channels are turned off during a first portion of a switching cycle of said converter, and said third switch is turned off to transmit energy from said input voltage to said plurality of output channels, and said plurality of output channels are sequentially turned on during a second portion of said switching cycle.

3. The converter of claim 2, wherein said converter is configured to operate in a constant frequency control manner, and a last channel remains on until a present switching cycle is completed.

4. The converter of claim 1, wherein said control circuit is configured to generate a first control signal for controlling said first and second switches, a second control signal for controlling said third switch, and output control signals to control said plurality of output channels.

5. The converter of claim 4, wherein:
   a) a superimposition of a sawtooth wave signal and an inductor current sense signal are employed by said control circuit to respectively compare against said first reference signal and a second reference signal that is less than said first reference signal, in order to generate said first and second control signals;
   b) when said superimposition of said inductor current sense signal and said sawtooth wave signal is not greater than said second reference signal, said third switch is controlled to be on by said control circuit; and
   c) when said superimposition of said inductor current sense signal and said sawtooth wave signal is not greater than said first reference signal, said first switch is controlled to be on by said control circuit.

6. The converter of claim 5, wherein a difference between said first and second reference signals represents a difference between said output voltages and said input voltage to determine the operation states of said converter.

7. The converter of claim 4, wherein:
   a) said first reference signal is less than said sawtooth wave signal;
   b) said second reference signal is greater than a valley value of said sawtooth wave signal; and
   c) a difference between said first and second reference signals is less than a peak to peak value of said sawtooth wave signal.

8. The converter of claim 4, wherein:
   a) a first output channel of said plurality of output channels is controlled to be turned on when said third switch is controlled to be off according to said second control signal by said control circuit;
   b) a feedback compensation signal is obtained by sampling and compensating an output voltage of said first channel; and
   c) an output current sense signal is superimposed on a corresponding sawtooth wave signal, and further compared against said feedback compensation signal to control the turn off of said first output channel.

9. The converter of claim 8, wherein:
   a) after completing the turn on and turn off of said first output channel, a latter channel is simultaneously turned on when a former channel is turned off;
   b) in order to turn off said latter channel, an output voltage of said latter channel is sampled and compensated to obtain a corresponding feedback compensation signal; and
   c) an output current sense signal of said latter channel is superimposed on a corresponding sawtooth wave signal and further compared against said feedback compensation signal to control the turn off of said latter channel.

10. The converter of claim 1, wherein said first and second switches are controlled based on a comparison of a sawtooth wave signal against said first reference signal.

11. A method of controlling a converter, wherein said converter comprises a first switch, a second switch, a first switch having a first terminal for receiving an input voltage, and a second terminal coupled to a first terminal of a second switch, an inductor having a first terminal coupled to a common node of said first and second switches, and a second terminal coupled to a first terminal of a third switch, wherein second terminals of said second and third switches are directly connected to ground, and a plurality of output channels coupled to a common node of said inductor and said third switch, the method comprising:
   a) determining whether said converter operates in a buck-boost mode, a buck mode, or a boost mode based on the relationship between said input voltage and a plurality of output voltages of said plurality of output channels, wherein said converter is configured to operate in any of said buck-boost mode, said buck mode, and said boost mode;

b) controlling said first, second, and third switches in response to said determined mode of operation and a switching cycle of said converter, wherein a first reference signal is used for controlling said first and second switches; and c) generating said first reference signal from a summation based on said plurality of output voltages and a plurality of coefficients that correspond to said plurality of output channels, wherein said plurality of coefficients are adjustable in accordance with weighted priorities of each of said plurality of output channels.

12. The method of claim 11, further comprising when said converter operates in said buck-boost mode:

a) turning on said first and third switches such that said inductor receives energy from said input voltage during a first operation stage of said switching cycle;

b) turning off said third switch and sequentially turning on said plurality of said output channels during a second operation stage of said switching cycle;

c) turning off said first switch, turning on said second switch, and sequentially turning on said plurality of said output channels during a third operation stage of said switching cycle;

d) when said converter operates in said buck mode, turning off said third switch, turning on said first switch to transmit energy to said plurality of output channels, and sequentially turning on said plurality of output channels during a first portion of said switching cycle;

e) when said converter operates in said buck mode, turning on said second switch as a free-wheeling diode during a second portion of said switching cycle;

f) when said converter operates in said boost mode, turning off said second switch, turning on said first and third switches to transmit energy from said input voltage to said inductor, and turning off each of said plurality of output channels are turned off during a first portion of said switching cycle; and g) when said converter operates in said boost mode, turning off said third switch to transmit energy from said input voltage to said plurality of output channels, and sequentially turning on said plurality of output channels during a second portion of said switching cycle.

13. The method of claim 12, further comprising controlling said converter in a constant frequency manner, wherein a last channel remains on until a present switching cycle is completed.

14. The method of claim 11, further comprising:

a) generating a first control signal for controlling said first and second switches, and a second control signal for controlling said third switch; and b) outputting control signals to control said plurality of output channels.

15. The method of claim 11, further comprising:

a) superimposing an inductor current sense on said sawtooth wave signal, and further respectively comparing against said first reference signal and a second reference signal that is less than said first reference signal to generate said first and second control signals, wherein when a superimposition of said inductor current sense signal and said sawtooth wave signal is not greater than said second reference signal, said third switch is controlled to be on; and b) when said superimposition of said inductor current sense signal and said sawtooth wave signal is not greater than said first reference signal, said first switch is controlled to be on by said control circuit.

16. The method of claim 15, wherein a difference between said first and second reference signals represents a difference between said output voltages and said input voltage to determine the operation states of said converter.

17. The method of claim 15, wherein:

a) said first reference signal is less than said sawtooth wave signal;

b) said second reference signal is greater than a valley value of said sawtooth wave signal; and c) a difference between said first and second reference signals is less than a peak to peak value of said sawtooth wave signal.

18. The method of claim 15, wherein said first and second switches are controlled based on a comparison of a sawtooth wave signal against said first reference signal.

19. The method of claim 11, further comprising:

a) turning on a first output channel of said plurality of output channels when said third switch is turned off;

b) generating a feedback compensation signal by sampling and compensating an output voltage of said first channel; and c) superimposing an output current sense signal on a corresponding sawtooth wave signal, and further comparing against said feedback compensation signal to control the turn off of said first output channel.

20. The method of claim 19, further comprising:

a) after completing the turn on and turn off of said first output channel, simultaneously turning on a latter channel when a former channel is turned off;

b) generating a corresponding feedback compensation signal by sampling and compensating an output voltage of said latter channel in order to turn off said latter channel; and c) controlling the turn off of said latter channel by superimposing an output current sense signal of said latter channel on a corresponding sawtooth wave signal and further comparing against said feedback compensation.

* * * * *